3,044,883
SHAPE-RETAINING PEANUT SPREAD
Edgar A. Ferguson, Jr., Brooklyn, N.Y., assignor, by mesne assignments, to Fine Brands Corporation
No Drawing. Filed July 26, 1960, Ser. No. 45,289
18 Claims. (Cl. 99—128)

The present invention relates to a new peanut spread, and more particularly to a peanut spread which is shape-retaining, i.e. which can be made in the form of bars or the like and which will hold its shape even in warm weather, while also being spreadable just after removal from the refrigerator.

The present invention also relates to a peanut spread of the above type which has these desired properties of shape retention and spreadability while also having a superior and highly pleasant taste.

All prior attempts to make peanut spread with sufficient rigidity to retain their shape in warm weather and for shipping either resulted in a product which upon refrigeration could not be spread, or a product in which the oil would leach out.

Other problems in connection with the production of a shape-retaining peanut spread, in addition to the obvious problems of taste and desirable appearance, were difficulty of providing a product of which could be extruded into bars or the like and the difficulties of providing a product which would not lose its shape on the shelf, but would not be too hard for easy spreading.

It is accordingly a primary object of the present invention to provide a peanut spread which is shape-retaining and which at the same time has all of the desirable properties set forth above.

It is another object of the present invention to provide a peanut spread composition which can be extruded into bars, wherein the bars retain their shape upon storage on the shelf, and wherein the composition can be easily spread even when under refrigeration.

It is yet another object of the present invention to provide a peanut spread having all of these characteristics and also having an excellent and desirable taste and appearance.

It is still a further object of the present invention to provide a peanut spread composition having sufficient rigidity to be molded into hollow bars or the like and wherein these hollowed portions can be filled with jelly, jam, or the like.

Other objects and advantages of the present invention will be apparent from a further reading of the specifications and of the appended claims.

With the above and other objects in view, the present invention mainly comprises a shape-retaining peanut spread, comprising between about 20–60 percent by weight of an oil composition containing as oil component only edible oils and having a melting point in the range of about 90–100° F., the oil composition including about 0.5–10 percent by weight of cotton stearine and between about 2.5–20 percent by weight of higher fatty acid monoglycerides such as glycerol monostearate and glycerol monopalmitate, or mixtures thereof, of vegetable origin, and between about 40–80 percent by weight of peanut butter. The peanut spread may also contain up to 10% by weight of honey, preferably 1–10 percent by weight of honey and most preferably about 1–2 percent by weight of honey. The peanut spread may also contain in addition to the honey about 1–2 percent by weight of a six carbon sugar such as dextrose. Still further, the peanut spread may contain salt and skimmed milk in amounts as desired for flavoring purposes.

It is to be understood that the term "cotton stearine" as used throughout the specification and claims in this case is used in the ordinary sense as understood in the art, the cotton stearine as is well known being a high melting point distillation residue of cottonseed oil having a melting point of 155–170° F., and most preferably of about 160° F.

As the edible oil component of the oil composition it is preferred to use hydrogenated oils, and most preferably a mixture of hydrogenated cottonseed oil and hydrogenated soybean oil having a melting point of 90–120° F., and most preferably having a melting point of about 112° F. To this oil component is added the 0.5–10 percent by weight of cotton stearine for the purpose of giving the composition the necessary rigidity so that the peanut spread of the present invention will be shape-retaining even upon storage on the shelf at room temperature, and even in warm temperatures.

The higher fatty acid monoglycerides such as glycerol monostearate and glycerol monopalmitate which are added to the oil composition are for the purpose of giving the peanut spread added spreadability even at low temperatures. The normal spreadability of the peanut butter is somewhat spoiled by the addition of the cotton stearine which, as pointed out above, is necessary to give the product shape-retaining ability. Accordingly, by proper adjustment of the amount of cotton stearine and higher fatty acid monoglycerides the present invention provides for the possibility of achieving shape-retention while still having a high degree of spreadability even at low temperatures.

The amount of cotton stearine which is between 0.5–10 percent by weight of the oil composition is more preferably between 1–7.5 percent by weight and most preferably about 7.5 percent by weight of the oil composition.

The amount of higher fatty acid monoglycerides which is preferably between 2.5 and 20 percent by weight of the oil composition is more preferably between 2.5–5 percent by weight and most preferably about 5 percent by weight of the oil composition.

As indicated above it is preferred to use hydrogenated vegetable oils as the oil component of the oil composition. However, it is also possible to use unsaturated oils such as cottonseed oil, in which case the same must be combined with a high melting point hydrogenated oil such as a high distillation residue of hydrogenated cottonseed oil having a melting point of 155–170° F., preferably 160° F. in an amount such that the mixture has a melting point in the range of 90–120° F., of preferably about 112° F. Instead of the high melting point distillation residue of cottonseed oil, i.e. cotton stearine, it is possible to use an animal fat such as lard which has a melting point in the range of 155–170° F. so that the mixture of the unsaturated edible oil and the lard has a melting point in the range of about 90–120° F. Generally about 10–30 percent by weight of cotton stearine or the lard with respect to the weight of the unsaturated oil is needed so that the mixture will have the melting point within the range of 90–120° F.

The peanut butter which is used in the spread of the present invention should be of a non-leachable variety, which is the type made by adding hydrogenated peanut oil which has been specially hardened by multiple hydrogenations so as to melt at 155–170° F. to the peanuts while the same are being ground and when the same has reached the temperature of approximately 160° F. The amount of hydrogenated peanut oil which is added to the ground peanuts is generally about 4–7 percent by weight, most preferably about 5 percent by weight. Salt is added at the same time to give good distribution with a moisture content of up to 15 percent. This peanut butter to which the hydrogenated peanut oil has been added differs from ordinary peanut butter by the addition of the hydrogenated peanut oil and is advantageous in the composition of the present invention in that it is of the non-leachable variety.

When peanut butter of this type is used in the preparation of the peanut spread of the present invention there is an improved shelf-life and no leaching or leaking of oil in the container. In fact, the peanut spread of the composition of the present invention can even be packed in paper or foil containers and it is not necessary to use glass containers, which is of course a great advantage, particularly wtih respect to shipping weight.

The honey in the peanut spread of the present invention is not entirely necessary but may be added as a sweetener, and also as a plasticizer. With respect to taste the amount of honey added may be up to 10 percent. However, since very high amounts of honey may render the product too plastic it is preferred to have lesser amounts of honey, e.g. about 1–2 percent by weight. If the peanut spread of the invention is to be made in the form of a hollow body such as a hollowed bar in which jelly is to be contained the amount of honey should preferably be about 1–2 percent by weight, most preferably about 1 percent by weight, with a six-carbon sugar added for taste and shape-rentention, e.g. dextrose.

The salt and skimmed milk are of course added to taste.

The following examples are given to illustrate the present invention. The scope of the invention is not, however, meant to be limited to the specific details of the examples:

Example 1

The oil composition portion of the peanut spread is prepared by mixing 1000 pounds of equal parts by weight of hydrogenated cottonseed oil and hydrogenated soybean oil with 50 pounds of equal parts by weight of glycerolmonostearate and glycerolmonopalmitate and 10 pounds of cotton stearine having a melting point of 160° F.

In preparing this oil composition the cotton stearine and monoglycerides are dissolved in the hydrogenated oils at 165° F. and stirred.

325 pounds of the heated oil composition are then mixed with 600 pounds of peanut butter, 20 pounds of honey, 6½ pounds of salt and 2 quarts of skimmed milk. The temperature of the mixture immediately drops to about 100° F. which is suitable for making a paddled slurry.

The salt, milk and honey are distributed over the peanut butter mass and mixed therewith to roughly distribute into the peanut butter before adding the peanut butter to the oil.

The mixture is thoroughly paddled together without the inclusion of air until a slurry which is viscous but thin enough to pour is formed. This may be poured into whatever shape desired and placed in a cold locker. Crystal formation and rigidity is enhanced by fairly rapid cooling, but this is not essential.

The consistency of the resulting product is exactly as desired, the product being shape-retaining and being spreadable at all temperatures.

The above mixture may also be extruded into the shape of bars or may be molded with a hollow dip-out portion. Jelly may be incorporated into the hollowed out portion.

Example 2

A peanut spread is prepared exactly as described in Example 1, however with the use of 25 pounds of cotton stearine in the preparation of the oil composition. The resulting peanut spread has a slightly harder consistency.

Example 3

A peanut spread is prepared as in Example 1, however using 50 pounds of cotton stearine in the preparation of the oil composition. The resulting peanut spread has a slightly harder consistency than that produced according to Example 2.

Example 4

A peanut spread is prepared as described in Example 1, however using 75 pounds of cotton stearine in the preparation of the oil composition. The consistency of the resulting peanut spread is slightly harder than in Example 3.

Example 5

A peanut spread is prepared according to Example 1, however using 200 pounds of the oil composition and 800 pounds of peanut butter. The resulting spread has a slightly stronger peanut taste than that produced according to Example 1.

Example 6

A peanut spread is prepared according to Example 1, however using 600 pounds of the oil composition and 400 pounds of peanut butter. The resulting peanut spread has good shape-retention and rigidity, however having a slightly more oily taste than the peanut spread of Example 1.

Example 7

A peanut spread is prepared according to Example 4, however using 200 pounds of the oil composition and 600 pounds of peanut butter. The resulting peanut spread has a good consistency and shape-retention, however having a strong peanut taste.

Example 8

A peanut spread is prepared according to Example 4, however using 600 pounds of the oil composition and 400 pounds of peanut butter. The resulting peanut spread is silghtly on the hard side, but still being spreadable, has a slightly oily though very good peanut taste.

In the above examples and elsewhere in this description it is possible to substitute for the mentioned cotton stearine any specially hardened or hard fraction of an edible (animal or vegetable) fat having a melting point of 155–170° F., and most preferably of about 160° F. Thus, it is possible to use a special fraction of lard, having the above melting point, or any hydrogenated vegetable oil instead of hydrogenated cottonseed oil (cotton stearine), e.g. the corresponding product made from peanut oil (which can be called peanut stearine).

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. A shape-retaining peanut spread, comprising between about 20–60% by weight of an oil composition containing as oil component only edible oils and having a melting point in the range of about 90–120° F., said oil composition including between about 0.5–10% by weight of cotton stearine and between about 2.5–20% by weight of higher fatty acid monoglycerides; and between about 48–80% by weight of peanut butter.

2. A shape-retaining peanut spread, comprising between about 20-60% by weight of an oil composition containing as oil component only edible oils and having a melting point in the range of about 90-120° F., said oil composition including between about 0.5-10% by weight of cotton stearine and between about 2.5-20% by weight of higher fatty acid monoglycerides; between about 40-80% by weight of peanut butter; and also containing between 1-10% by weight of honey.

3. A shape-retaining peanut spread, comprising between about 20-60% by weight of an oil composition containing as oil component only edible oils and having a melting point in the range of about 90-120° F., said oil composition including between about 0.5-10% by weight of cotton stearine and between about 2.5-20% by weight of higher fatty acid monoglycerides; between about 40-80% by weight of peanut butter; and also containing between 1-2% by weight of honey.

4. A shape-retaining peanut spread, comprising between about 20-60% by weight of an oil composition containing as oil component only edible oils and having a melting point in the range of about 90-120° F., said oil composition including between about 0.5-10% by weight of cotton stearine and between about 2.5-20% by weight of higher fatty acid monoglycerides; between about 40-80% by weight of peanut butter; and also containing between 1-2% by weight of honey and 1-2% by weight of a 6-carbon sugar.

5. A shape-retaining peanut spread, comprising between about 20-60% by weight of an oil composition containing as oil component only edible oils and having a melting point in the range of about 90-120° F., said oil composition including between about 0.5-10% by weight of cotton stearine and between about 2.5-20% by weight of higher fatty acid monoglycerides; between about 40-80% by weight of peanut butter; also containing between 1-2% by weight of honey and 1-2% by weight of a 6-carbon sugar; and containing salt and skimmed milk as flavorings.

6. A shape-retaining peanut spread, comprising between about 20-60% by weight of an oil composition containing as oil component only edible oils and having a melting point in the range of about 90-120° F., said oil composition including between about 1-7.5% by weight of cotton stearine and between about 2.5-5% by weight of higher fatty acid monoglycerides; and between about 40-80% by weight of peanut butter.

7. A shape-retaining peanut spread, comprising between about 20-60% by weight of an oil composition containing as oil component only edible oils and having a melting point in the range of about 90-120° F., said oil composition including about 7.5% by weight of cotton stearine and about 5% by weight of higher fatty acid monoglycerides; and between about 40-80% by weight of peanut butter.

8. A shape-retaining peanut spread, comprising between about 20-60% by weight of an oil composition containing as oil component only edible oils and having a melting point in the range of about 112° F., said oil composition including between about 0.5-10% by weight of cotton stearine and between about 2.5-20% by weight of higher fatty acid monoglycerides; and between about 40-80% by weight of peanut butter.

9. A shape-retaining peanut spread, comprising between about 20-60% by weight of an oil composition containing as oil component a mixture of hydrogenated cottonseed oil and hydrogenated soybean oil having a melting point in the range of about 90-120° F., said oil composition including between about 0.5-10% by weight of cotton stearine and between about 2.5-20% by weight of higher fatty acid monoglycerides; and between about 40-80% by weight of peanut butter.

10. A shape-retaining peanut spread, comprising between about 20-60% by weight of an oil composition containing as oil component an unsaturated edible oil mixed with high distillation residue cottonseed oil having a melting point in the range of about 155-170° F. in an amount such that the mixture has a melting point in the range of about 90-120° F., said oil composition including between about 0.5-10% by weight of cotton stearine and between about 2.5-20% by weight of higher fatty acid monoglycerides; and between about 40-80% by weight of peanut butter.

11. A shape-retaining peanut spread, comprising between about 20-60% by weight of an oil composition containing as oil component an unsaturated edible oil mixed with high distillation residue cottonseed oil having a melting point in the range of about 155-170° F. in an amount of about 10-30% by weight such that the mixture has a melting point in the range of about 90-120° F., said oil composition including between about 2.5-20% by weight of higher fatty acid monoglycerides; and between about 40-80% by weight of peanut butter.

12. A shape-retaining peanut spread, comprising between about 20-60% by weight of an oil composition containing as oil component only edible oils and having a melting point in the range of about 90-120° F., said oil composition including between about 0.5-10% by weight of cotton stearine and between about 2.5-20% by weight of higher fatty acid monoglycerides; and between about 40-80% by weight of non-leachable peanut butter containing salt and 2-7% by weight of hydrogenated peanut oil.

13. A shape-retaining peanut spread, comprising between about 20-60% by weight of an oil composition containing as oil component only edible oils and having a melting point in the range of about 90-120° F., said oil composition including between about 0.5-10% by weight of cotton stearine and between about 2.5-20% by weight of higher fatty acid monoglycerides; and between about 40-80% by weight of peanut butter containing up to 30% unsaturated oils.

14. A shape-retaining peanut spread, comprising between about 20-60% by weight of an oil composition containing as oil component only edible oils and having a melting point in the range of about 90-120° F., said oil composition including between about 0.5-10% by weight of cotton stearine and between about 2.5-20% by weight of higher fatty acid monoglycerides; and between about 40-80% by weight of peanut butter containing about 30% unsaturated oils.

15. A shape-retaining peanut spread, comprising between about 20-60% by weight of an oil composition containing as oil component only edible oils and having a melting point in the range of about 90-120° F., said oil composition including between about 0.5-10% by weight of cotton stearine and between about 2.5-20% by weight of higher fatty acid monoglycerides; and between about 40-80% by weight of peanut butter, said peanut butter spread being in the form of a hollow body and containing a jelly in the hollow portion thereof.

16. A shape-retaining peanut spread, comprising between about 20-60% by weight of an oil composition containing as oil component only edible oils and having a melting point in the range of about 90-120° F., said oil composition including between about 0.5-10% by weight of a hard saturated edible fat having a melting point in the range of about 155-170° F. and between about 2.5-20% by weight of higher fatty acid monoglycerides; and between about 40-80% by weight of peanut butter.

17. A shape-retaining peanut spread, comprising between about 20-60% by weight of an oil composition containing as oil component only edible oils and having a melting point in the range of about 90-120° F., said oil composition including between about 0.5%-10% by weight of hard hydrogenated vegetable oil having a melting point in the range of about 155-170° F. and between about 2.5-20% by weight of higher fatty acid monoglycerides; and between about 40-80% by weight of peanut butter.

18. A shape-retaining peanut spread, comprising between about 20–60% by weight of an oil composition containing as oil component only edible oils and having a melting point in the range of about 90–120° F., said oil composition including between about 0.5%–10% by weight of peanut stearine having a melting point in the range of about 155–170° F. and between about 2.5–20% by weight of higher fatty acid monoglycerides; and between about 40–80% by weight of peanut butter.

References Cited in the file of this patent

UNITED STATES PATENTS

| | | |
|---|---|---|
| 1,620,898 | Kidd | Mar. 15, 1927 |
| 1,926,369 | Brown | Sept. 12, 1933 |
| 2,911,303 | Rowland et al. | Nov. 3, 1959 |

OTHER REFERENCES

"1001 Sandwiches," by Cowles, Little, Brown and Company, Boston, 1936, p. 124.